(12) United States Patent
Freeman

(10) Patent No.: US 11,809,309 B2
(45) Date of Patent: Nov. 7, 2023

(54) TEST RESULT STABILITY SCORING IN INTEGRATION TESTING

(71) Applicant: GM Cruise Holdings LLC, San Francisco, CA (US)

(72) Inventor: Eben M Freeman, San Francisco, CA (US)

(73) Assignee: GM CRUISE HOLDINGS LLC, San Francisco, CA (US)

(*) Notice: Subject to any disclaimer, the term of this patent is extended or adjusted under 35 U.S.C. 154(b) by 34 days.

(21) Appl. No.: 17/561,236

(22) Filed: Dec. 23, 2021

(65) Prior Publication Data
US 2023/0205679 A1    Jun. 29, 2023

(51) Int. Cl.
G06F 11/36    (2006.01)
G06F 8/36    (2018.01)

(52) U.S. Cl.
CPC ............ G06F 11/3688 (2013.01); G06F 8/36 (2013.01); G06F 11/3664 (2013.01)

(58) Field of Classification Search
None
See application file for complete search history.

(56) References Cited

U.S. PATENT DOCUMENTS

| | | | | |
|---|---|---|---|---|
| 6,038,517 A | * | 3/2000 | Dobbins | G06F 11/008 714/E11.02 |
| 9,235,607 B1 | * | 1/2016 | Ross | G06F 16/215 |
| 10,289,539 B1 | * | 5/2019 | Arguelles | G06F 11/3664 |
| 11,281,567 B1 | * | 3/2022 | Machalica | G06N 7/00 |
| 2013/0275949 A1 | * | 10/2013 | Kawashima | G06F 11/3692 717/124 |
| 2016/0077956 A1 | * | 3/2016 | Bhattacharya | G06F 11/3688 717/124 |
| 2017/0192873 A1 | * | 7/2017 | Ozdemir | G06F 8/658 |
| 2018/0253372 A1 | * | 9/2018 | Colaiacomo | G06F 11/3692 |
| 2019/0057019 A1 | * | 2/2019 | Lee | G06F 11/3664 |
| 2019/0087315 A1 | * | 3/2019 | Tailor | G06F 11/3688 |

OTHER PUBLICATIONS

Suffian, "Consistency of System Test Case Results for Soft ware Capability Rating", 2018, International Conference on Computer and Information Sciences (ICCOINS) (Year: 2018).*

* cited by examiner

*Primary Examiner* — Hossain M Morshed
(74) *Attorney, Agent, or Firm* — Akona IP PC

(57) ABSTRACT

Software code is tested to determine relative performance of the software code. Successfully executing a test may be used to flag problems in a code repository to be corrected or criteria for accepting code for acceptance to the repository. To further evaluate test results, the test may be run several times on the same code version to determine a test result stability score describing how the test results may vary in different executions, such as a frequency that the code passes the test. Based on the score, additional tests may be run to further refine test result stability score. To evaluate time-variance of testing, when a code version fails a test, a previous version of the code may be run with the same test and the results compared to determine if a new regression was introduced.

20 Claims, 4 Drawing Sheets

TEST RESULT STABILITY SCORING IN INTEGRATION TESTING

TECHNICAL FIELD

This disclosure relates generally to testing code modifications and software reliability, and particularly for evaluating reliability of test results.

BACKGROUND

Software code is often stored in a software repository, which may include various versions of the same codebase. This enables developers to release a specific form of the code, branch versions of the code to develop various features, and developers to work on versions of the code without affecting the main codebase. In general, software testing may also be used to verify the successful implementation of features and continuing performance of existing features in the software. One type of such testing may be performed to verify that code committed to a codebase (e.g., to a particular branch of the codebase) performs appropriately, such that the code being committed may be tested before the revisions are applied to ensure the code does not introduce significant errors, particularly when combined with modifications that may also be made by other developers.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DETAILED DESCRIPTION

Overview

Figure 1:
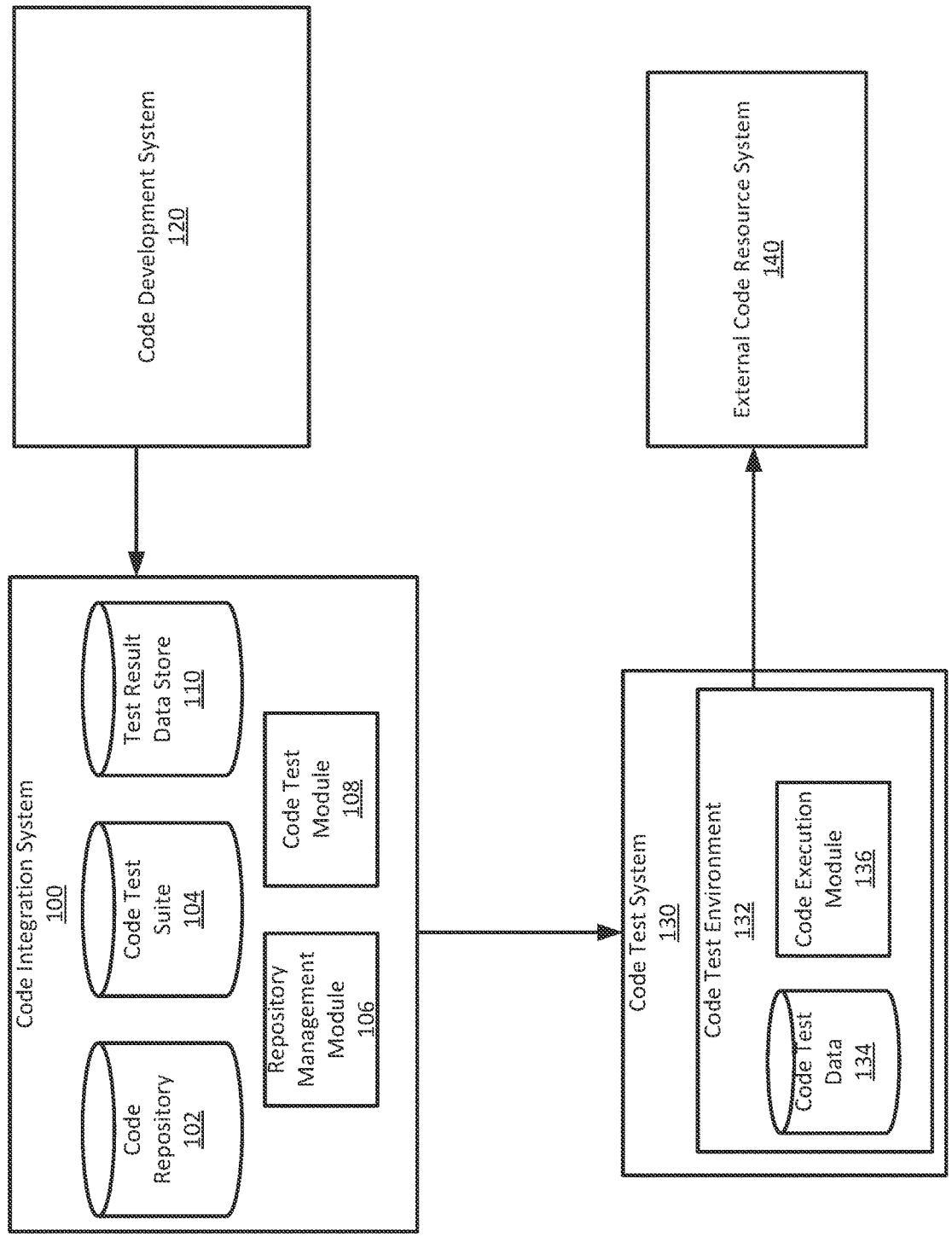
FIG. 1 shows an example code development (e.g., software code) and related testing environment, according to one embodiment.

In some environments, committed code may be frequently tested to verify successful operation with respect to one or more tests. By testing frequently in such an approach, errors may be detected and addressed early in the development process and the likely cause of the error (i.e., the code committed since the last successful test) may be readily detected. By testing frequently, the number of errors is generally expected to be low and the possible sources of those errors (the amount of modified code) is also expected to be limited, allowing errors to be caught and corrected early.

However, such approaches may rely on relatively consistent test environments and test results that are stable if tests are re-run on the same code. When test results may not produce stable, consistent results, such that a test reporting a "fail" may not reliably be associated with a code error, the effectiveness of regular testing may be significantly reduced as developers attempt to identify problems in the code which were erroneously reported due to unstable, inconsistent results from a test. The present disclosure provides approaches for identifying and addressing sources of such inconsistency in automated testing environments.

A code repository manages software code versions, including branches of software code for implementing features during development of the software code. At specified times, either periodically or when a user requests to commit revised software code to the repository, the repository may execute a set of tests on the revised software code to identify potential errors to be corrected in the code, such that the code may be fixed before the error remains in the code for a substantial amount of time. While the tests may be designed to generate consistent results and execute in an identical code test environment, for various reasons the tests, as applied to the same software, may yield differing results: a test sometimes report a failure when executing the same test on the same code for which the test usually reports a success.

In one embodiment, the code repository (or testing module thereof) determines a test result stability score for a test to describe the consistency of test results from executing the test (also termed a test protocol) on the code. In one embodiment, the test result stability score may be the frequency (e.g., a percentage frequency) that the test reports a pass for the code relative to the number of times the code was evaluated by the test protocol. As such, a test which reports a pass for the same software code nine times and a failure a tenth time may have a pass frequency of 90%.

To reduce the frequency that tests are re-executed on the same code, the tests may be run an initial number of times to determine a test result stability score and, depending on the resulting score, run additional times to further refine the stability score for the test as executed on that code at that time. That is, a limited number of initial test protocol runs may be applied to determine a rough estimate of the test result stability score. In general, the test protocol may be run few times when the code consistently passes or fails the test. For example, the code successfully passing the test three times out of three times the test protocol is run may yield a test result stability score of 100 (e.g., 100% pass frequency), such that the likelihood that the test would not pass a significant frequency of further applications of the same test protocol are relatively low. Likewise, in one embodiment if the code fails the first three test protocol executions, it may also have a test result stability score of 100 (e.g., the results are 100% consistent). However, when the different times that the test protocol is run yields significant variation in results (e.g., two passes and one fail), then additional runs of the test protocol may be designated for the software code to determine a revised test result stability score that, because it is based on further trials of the test protocol, may yield higher confidence in the resulting test result stability score. The test result stability score may then be used for various purposes, such as accepting or rejecting code versions for submission to the repository, or for evaluating the test protocol itself when it frequently yields inconsistent results when applied to various software code versions. Additional approaches for determining and using a test result stability score are further discussed below.

In additional circumstances, results from a test protocol may be affected by various characteristics of the code test environment, and in some circumstances the passage of time may also mean that a code version that successfully passed a test protocol may no longer pass the test protocol at a future time. Stated another way, the results of executing the test protocol may not be time-invariant. As such, when a code version is evaluated by a test protocol, in one embodiment when the test protocol yields test results that do not meet requirements for passing the test protocol, the test protocol may be re-run on a previous version of the code from which the tested version is derived. The previous version may have previously recorded test results which passed the test protocol.

To verify that the execution of the test on the tested code version was not affected by the time-variation of the test protocol, the test protocol may be re-run on the previous code and, optionally, on the current code. In some embodiments, the test protocol is re-run on code each version. The test results from each of the code versions may be evaluated and compared to determine if the current code version actually performs worse relative to the prior version when executed on the test protocol as the test protocol is executed now. In one embodiment, the test results are evaluated by determining respective test result stability scores as discussed above. By re-running the prior version of the software code only when the current version fails the test protocol, the resources for running the test protocol again on the previous version are not unnecessarily used in advance for re-evaluating tests which the current code passes. In addition, by focusing on the relative performance of the new software code version with the previous code version on the test protocol as it executes now, the current code may be considered to pass the test when the performance is similar (e.g., it is excused from the indicated failure of the test). Although the test was initially considered not to be a pass, the re-running of the prior version permits the current code version to be re-considered with respect to whether it introduces any regression with respect to the prior code version when executing the test. That is, when the prior version performs similarly, the current version does not further cause regression with respect to the test, suggesting that some other cause may have introduced any reduced performance, rather than an error in the new code. This further allows accepting the current code (and gaining its benefits) without further harming performance on that test, despite that the test initially was evaluated as a failure when run on the new code.

Additional details and variations of these aspects are further discussed in detail below.

As will be appreciated by one skilled in the art, aspects of the present disclosure, may be embodied in various manners (e.g., as a method, a system, a computer program product, or a computer-readable storage medium). Accordingly, aspects of the present disclosure may be implemented in hardware, software, or a combination of the two. Thus, processes may be performed with instructions executed on a processor, or various forms of firmware, software, specialized circuitry, and so forth. Such processing functions having these various implementations may generally be referred to herein as a "module." Functions described in this disclosure may be implemented as an algorithm executed by one or more hardware processing units, e.g., one or more microprocessors of one or more computers. In various embodiments, different steps and portions of the steps of each of the methods described herein may be performed by different processing units and in a different order unless such an order is otherwise indicated, inherent or required by the process. Furthermore, aspects of the present disclosure may take the form of one or more computer-readable medium(s), e.g., non-transitory data storage devices or media, having computer-readable program code configured for use by one or more processors or processing elements to perform related processes. Such a computer-readable medium(s) may be included in a computer program product. In various embodiments, such a computer program may, for example, be sent to and received by devices and systems for storage or execution.

This disclosure presents various specific examples. However, various additional configurations will be apparent from the broader principles discussed herein. Accordingly, support for any claims which issue on this application is provided by particular examples as well as such general principles as will be understood by one having ordinary skill in the art.

In the following description, reference is made to the drawings where like reference numerals can indicate identical or functionally similar elements. Elements illustrated in the drawings are not necessarily drawn to scale. Moreover, certain embodiments can include more elements than illustrated in a drawing or a subset of the elements illustrated in a drawing. Further, some embodiments can incorporate any suitable combination of features from two or more drawings.

As described herein, one aspect of the present technology may be the gathering and use of data available from various sources to improve quality and experience. The present disclosure contemplates that in some instances, this gathered data may include personal information. The present disclosure contemplates that the entities involved with such personal information respect and value privacy policies and practices.

The following disclosure describes various illustrative embodiments and examples for implementing the features and functionality of the present disclosure. While particular components, arrangements, or features are described below in connection with various examples, these are merely examples used to simplify the present disclosure and are not intended to be limiting.

Reference may be made to the spatial relationships between various components and to the spatial orientation of various aspects of components as depicted in the attached drawings. However, the devices, components, members, apparatuses, etc. described herein may be positioned in any desired orientation. Thus, the use of terms such as "above," "below," "upper," "lower," "top," "bottom," or other similar terms to describe a spatial relationship between various components or to describe the spatial orientation of aspects of such components, should be understood to describe a relative relationship between the components or a spatial orientation of aspects of such components, respectively, as the components described herein may be oriented in any desired direction. When used to describe a range of dimensions or other characteristics (e.g., time, pressure, temperature, length, width, etc.) of an element, operations, or conditions, the phrase "between X and Y" represents a range that includes X and Y.

In addition, the terms "comprise," "comprising," "include," "including," "have," "having," or any other variation thereof, are intended to cover a non-exclusive inclusion. For example, a method, process, device, or system that comprises a list of elements is not necessarily limited to only those elements but may include other elements not expressly listed or inherent to such method, process, device, or system. Also, the term "or" refers to an inclusive or and not to an exclusive or.

Code Development and Testing Environment

FIG. 1 shows an example code development (e.g., software code) and related testing environment. The code environment shown in FIG. 1 includes various components for developing software code, managing versions and software development progress, and automatically testing code for evaluation and inclusion into the codebase. In general, a code integration system 100 manages a code repository 102 in which software code versions are stored. At various times, such as when software code versions are submitted, each week, each day, or other periodic or non-periodic times, the software code may be sent for software testing to evaluate performance of the software code and identify progress and/or potential errors of the software code. The environment shown in FIG. 1 also includes a code development system 120, on which a developer or another user accesses and develops code to be stored and implemented at the code integration system 100. The code integration system 100 receives the code and determines various times at which to execute tests to evaluate the software code using a variety of software code tests. The code integration system 100 communicates with a code test system 130 for execution of the tests on particular versions and portions of code. During testing, the executing code may use various external services, which are represented by an external code resource system 140. These components are now further discussed in turn.

Each of the systems shown in FIG. 1 may be a computing device of various types. For example, the code integration system 100 is typically a server-class system, which may include a plurality of individual computing systems and storage devices for managing and processing code requests and coordinating code testing and other services. Similarly, the code integration system 100 may include a compiler and other data for preparing code to be executed and tested. Likewise, the code test system 130 may be one or more server-class systems and may include distributed computing environments that provide configurable processing environments for various users. As one example, the code test system 130 may be a distributed cloud-based system which coordinates code testing in individual virtual machines or containers in which test processing may occur. The various systems shown in FIG. 1 may include a variety of additional components that are not illustrated here for sake of clarity. Such components may include data access modules (e.g., user login and access modulation), data replication and workflow management systems, and so forth. The various systems may also communicate with one another using various communication channels, such as wired or wireless networking interfaces and may communicate via a network, such as the Internet. In further examples, though shown in FIG. 1 as separate systems, in various embodiments the features and components of a particular system may be integrated into another; as such the functions and data described herein may be consolidated to fewer discrete systems or distributed to more systems than illustrated in FIG. 1. For example, the components of the code test system 130 may be integrated into the components of the code integration system 100. In further embodiments, the code development system 120 may also include interfaces for processes for initiating code tests, either on the code development system 120 itself, or in communication with the code test system 130.

In general, as noted above the code integration system 100 maintains a code repository 102 and additional components for receiving code revisions and managing a codebase along with coordinating tests thereof. The code integration system 100 includes additional data stores, including in this example a code test suite 104 and a test result data store 110. The code test suite 104 includes various tests (e.g., test protocols) for evaluation of code stored (or requested to be stored) in the code repository 102. The code test suite may include a variety of tests that may be executed at different times on the code to evaluate performance thereof. The results of individual tests as executed on different versions of code at different times may be stored in a test result data store 110.

The particular code managed by the code repository 102 may be used to perform any type of function according to the needs of the operator of the code integration system. The code managed by the code repository 102 may include code for applications to be executed on computing devices, such as mobile device applications, productivity software, financial management software, computer vision and artificial intelligence (AI) software and various other computer modeling, automated device perception and control algorithms, among various other applications of software technology. As such, the particular code stored at the code repository 102 may vary significantly in different embodiments.

Similarly, the code tests (e.g., individual test protocols) stored on code test suite 104 may also vary according to the particular testing needs of the code in the code repository 102. The tests in the code test suite 104 may include a variety of tests to be performed at different times on the code and may include more than one set of tests or test protocols used for evaluating the same type of performance of the code repository. For example, the code may include more than one test protocol for evaluating the success of a facial recognition feature of the code repository. Likewise, various test protocols may be applied for related aspects of the code under test, such as individual test protocols for perceiving and recognizing different types of objects based on sensor data, or controlling a device effectively in different types of environments according to desired parameters. In addition to the protocols for performing the tests, the code test suite 104 may include relevant data (or pointers thereto) that is used or processed during the code test. In one embodiment, the test data may also be stored at the code test system 130 for ready access when performing a test.

To execute a test, a code test module 108 retrieves the applicable version of software and assembles any necessary components for performing the desired test. Such components may include components of the software, such as computing modules, libraries, or other relevant aspects of a system required for executing the software test. The code test module 108 may also identify and retrieve any relevant test protocol and test data for the test. The test is executed in conjunction with the code test system 130. The code test system 130 provides a code test environment 132 in which the code is executed by a code execution module 136 in conjunction with the code test data 134.

In one embodiment, the code test environment 132 is intended to be hermetically isolated, such that the code test environment provides a consistent set of parameters and an environment in which the test may be executed. As noted above, the code test environment 132 may constitute a virtual machine or established processing resources within a container or other provisioned resource that may be created on demand, enabling the capacity for testing to increase or decrease as necessary.

Nonetheless, there may be situations that cause the test protocol to yield different results for the same code. In some examples, the test protocol or the code may process floating point numbers, such that there is a possibility of rounding errors which may become significant in the context of repeated use or based on the specific way in which code uses the floats. In other examples, the test protocol or code may be required to access external resources for performing functions, for example when test data is necessary for the test but may not be readily accessible or constant for the test, in which case the particular data on which a test protocol executes may vary. In addition, such external resources may be accessed via an external code resource system 140, which may be inconsistent, unreliable, or may have behavior that changes over time outside of the control of the code being evaluated by the test suite. Likewise, the underlying code test environment 132 may vary unexpectedly or in ways that are not addressed by known or stated parameters of the code test environment 132. For example, the system configuration of the code test environment 132 may be changed, such as the central processing unit (CPU), memory, or disk configuration. In other embodiments, such as virtual environments, there may be natural variation in the simulated CPU and other computing resources accessible to components within the code test environment 132. In addition, in additional examples the tests themselves and/or the data included by the test may include stochastic or at least partially randomized data elements or components, such that different executions for the test protocol may be expected to vary somewhat in execution are expected. As such, not only may the tests executed within the code test environment 132 provide inconsistent results when executed at one point in time repeatedly to the same code version, the same test may provide different results when applied over time.

After execution of a test, the results of the test may be evaluated and compared to criteria for determining pass or failure of the tests. In general, such pass or failure may be intended to be determined relatively simply for tests that may be performed frequently or based on requests to commit code, as longer-term execution may delay further code development work while the tests process. For example, pass or failure may be based on execution time of a test to perform a function, or evaluation of whether a code performed a calculation or came to an accurate result with sufficient precision within the elapsed time. In some embodiments, in addition to a "pass" or "fail" when evaluating the results of a test, tests may include subscores or other data that form constituent values in determining pass or fail of the test. For example, a test may be designed to determine whether an algorithm in the code executes to completion within thirty seconds, which is considered a pass, while executing longer than thirty seconds is considered a fail. While this may indicate "pass" or "fail" of the test, a subscore may also be generated indicating the exact amount of time that the algorithm took to process. The subscore may further include the criteria for determining a pass or fail and the criteria for evaluating positive (beneficial) or negative (detrimental) change in the underlying value. In this case, for example, the number of seconds for executing the operation may be provided, and the criteria may indicate that fewer seconds is preferred. The evaluation of the test results may be performed by the code test system 130 or by the code test module 108.

Finally, returning to the code integration system 100, the code repository 102 may be managed by a repository management module 106. The repository management module may receive requests from users to add, remove, or modify code in the code repository 102, including requests to create code branches, and to commit modifications of the code to the code repository 102. The code development system 120 may be in communication with the repository management module 106 to request a copy of a branch of code as well as to request that modifications made by the code development system 120 (e.g., by a user or developer of the system) are committed to the code repository 102. The repository management module 106 may further initiate code tests based on the request to commit code or periodically to implement continuous integration practices and identify potential errors in the code on a regular basis.

Code Repository and Version Management

Figure 2:
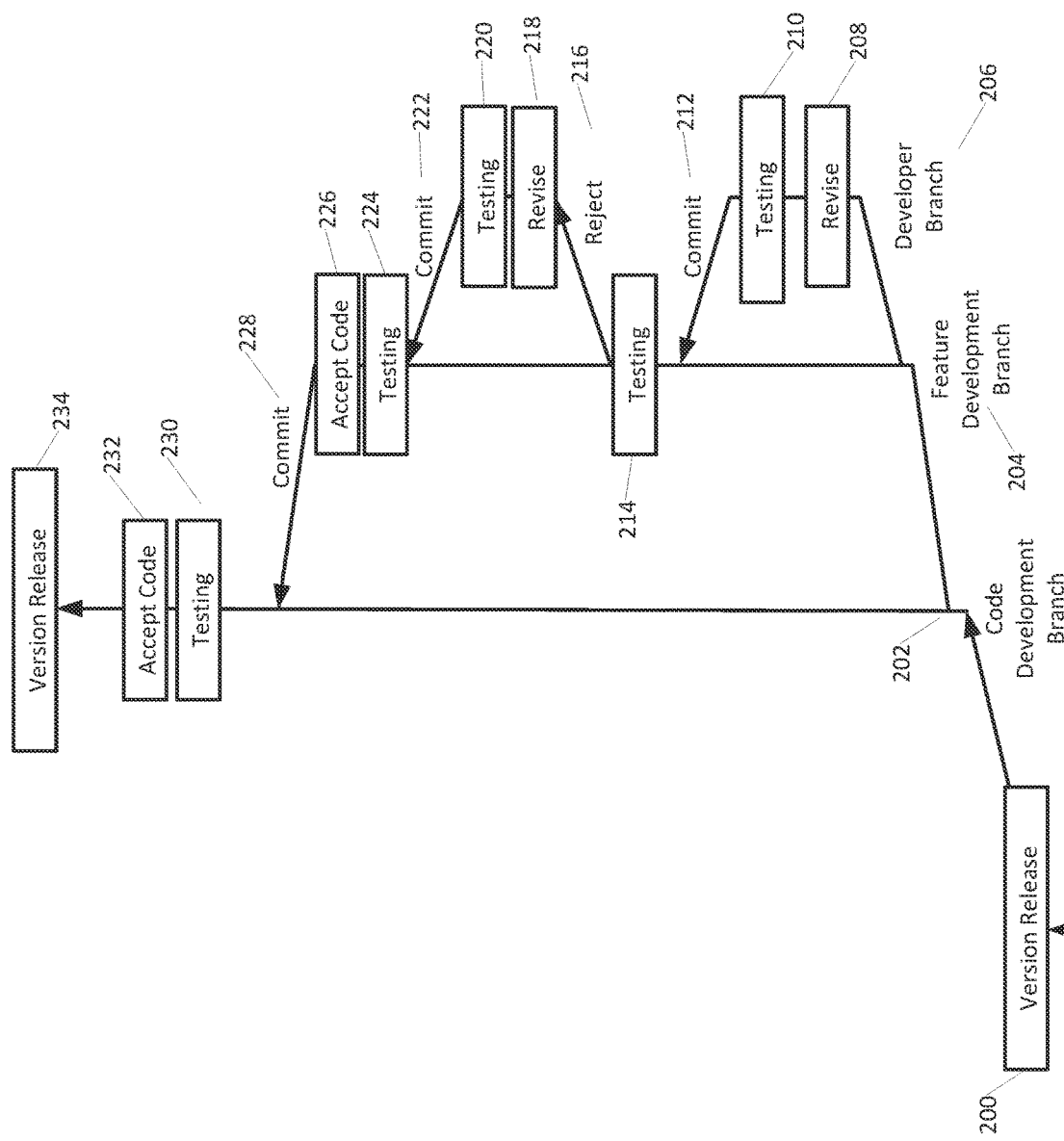
FIG. 2 illustrates an example version management of a code repository, according to one embodiment.

FIG. 2 illustrates an example version management of a code repository, according to one embodiment. As shown in FIG. 2, code may be managed as a set of branches of code that are individually developed and may be merged into one another. In this example embodiment, when code is merged from one branch to another (e.g., through a commit request), the repository management module 106 may perform testing of the code to determine whether the code may be accepted. A set or "suite" of different tests may be performed on the code and may vary depending on the code being committed and the stage or branch to which the code is being submitted. These aspects may each vary in different configurations according to the particular type of code, tests, and needs of the code integration system. In various embodiments, the results of the testing may cause different actions by the repository management module 106. In one example, the repository management module 106 may automatically accept code to the repository and merge changes from a commit request when the test results are acceptable. When the test results from the test suite do not pass or include a mixture of passing results and not-passing results, repository management module 106 may perform different actions according to its particular configuration, and may include rejecting the code changes, flagging the not-passing results, or otherwise performing actions to further verify the code before permitting acceptance to the code repository.

To better improve automatic processing of the version control and code acceptance processes, the tests may be evaluated for the consistency and stability of results, and to determine whether "failing" test results may in fact be consistent with performance of previously accepted code. As such, the approaches discussed herein may provide additional means for automatically evaluating test results and avoiding code rejection that might otherwise be accepted given the test result stability of the test indicating a failure.

In the code version management shown in FIG. 2, the code may be managed with the creation of explicit versions and branches for managing development of the code. In some other embodiments, the code may be managed without explicit versioning or separate branches, such that new "versions" of code may be distributed on a frequent basis, such as every day or week. In these examples, the code may be frequently tested and may be put into production (i.e., distributed to devices for execution) frequently, such that the testing for verifying code changes may be essential to preventing errors from propagating quickly to released code.

As shown in FIG. 2, a code branch may be developed to a version release 200. A version release may indicate a specific version of the code that typically functions well, is relatively stable, and may be distributed to consumers of the code. In addition, the version release typically marks a discrete point in time and respective functionality of the code at that point in time. After a version is released, additional code branches may be crated for adding further features or further revising the code for further releases. In this example, a code development branch 202 is created from the version release 200. The code development branch 202 may represent a main "trunk" of development for the next released version of the code. In some embodiments, multiple feature development branches 204 may be created, each of which may represent one or more characteristics or features to be added to the code based on edits made in the feature development branch 204. Similarly, in some circumstances a developer may create a developer branch, such as developer branch 206, that represents a version of the code on which an individual developer revises 208 the code. Before committing the code back to the feature development branch 204, the developer may execute a local test 210 of the developer branch 206. To incorporate the revisions into the feature development branch 204, the developer may provide a commit request 212 for the code modifications to be merged. In this embodiment, before accepting the revisions, the revisions may be tested 214 and in this example the test yields a failing result and the commit request 212 is rejected 216.

When a code commit is erroneously rejected (e.g., the developer did not in fact introduce any additional errors, the developer may devote significant time to revising 218 and performing further testing 220 the code before attempting a second commit request 222 again. As such, false signals about test failures may be significantly impactful on effective development, as developers may devote time hunting for errors which were not caused by the developer's revisions. In this example, after the second commit request 222, the code is tested again 224 and this time accepted 226. Similar to merging the developer branch 206 to the feature development branch 204, when the feature development branch 204 is ready, it too may be merged back to the main code development branch 202 for further testing 230, code acceptance 232, and a subsequent formal version release 234.

In practice multiple such feature development branches and developer branches may be created in code development projects (not shown). In additional embodiments, individual developers may effectively create developer branches and commit revisions to a feature development branch several times a week, and in some instances more than once a day. As such, in some embodiments, rather than testing code when a developer requests to commit the code, the code repository may instance a version of the code from a branch periodically, such as each day, that incorporates whatever changes have been made since the last time the code was tested and test the newly instanced version. In this example, developers may be permitted to commit code readily and frequent testing is relied on to determine potential errors for correction.

To more effectively evaluate test performance on code versions, various techniques may be applied to assess the significance of a "failure" of a test protocol applied to a code version.

Test Result Stability Scoring

Figure 3:
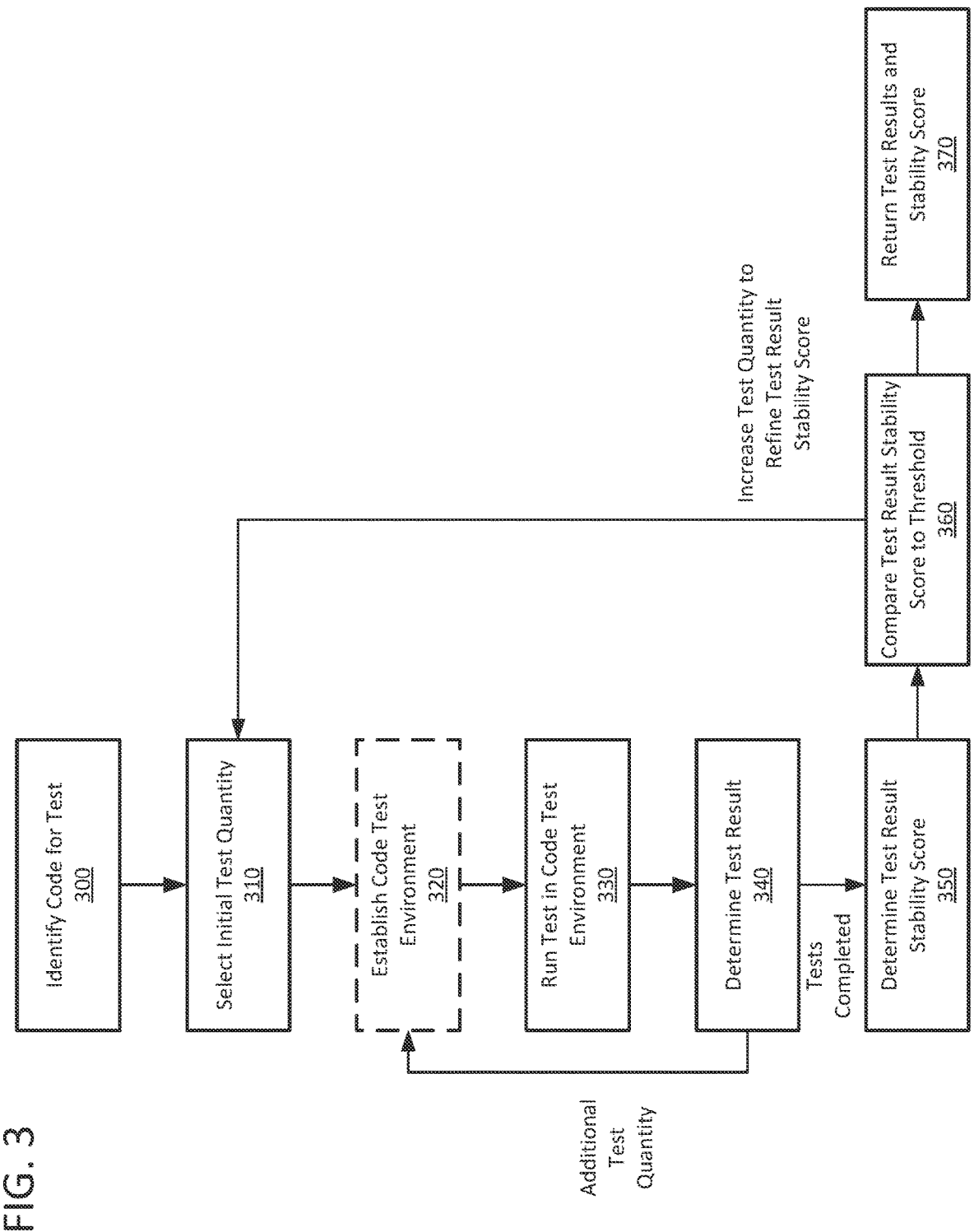
FIG. 3 shows an example flowchart for determining a test result stability score, according to one embodiment.

FIG. 3 shows an example flowchart for determining a test result stability score, according to one embodiment. The test result stability score is a score that evaluates the consistency, stability, or variation of test results for a particular test (i.e., a test protocol). That is, the test result stability score reflects the similarity of test results when the same test protocol is executed in the same conditions. For example, the same test protocol executed on a particular code version with the same test parameters. Such test parameters represent various conditions for the test, such as characteristics of the code test environment, data used in the test, etc., to the extent these are controllable by the test protocol. In some circumstances these characteristics may be uncontrollable or unknown by the test protocol. For a test run for a particular version of code, a test with high test result stability score yields the same results for each run—each repetition of the test "experiment" provides the same test results. The circumstances in which a test may yield different results (e.g., result in a fail instead of a success) may (at least initially) be unknown. In general, tests may also yield different results (with sufficiently significant variation) at a relatively low frequency (e.g., 1-5%), such that the test may be run many times successfully without revealing the possibility of a different result that is not caused by an adverse change in the code. For example, a test which produces 15 "pass" responses on the same tested code version may then produce a "fail" on the $16^{th}$ test run. While the code version has not changed, the particular execution in the $16^{th}$ test run nonetheless yields a different result. A test result stability score may thus be determined for an individual test protocol as executed on a particular version of code. In addition, a baseline test result stability score for the individual test protocol may be determined for the test based on the test result stability score of the test applied to a "known" version of the code (e.g., a released version) or with respect to an average of the test result stability scores applied to various code versions, such that the average may reflect "typical" or "expected" frequency of differing results when the test protocol is applied to a new (e.g., unknown) code version.

The test result stability score thus provides a metric for evaluating the frequency and/or significance with which a test result varies. In general, the test result stability score may be particularly concerned with the frequency that a test yields a pass or fail (e.g., accept or reject) result for tested code, and in one embodiment the test result stability score is the frequency of "pass" (or "fail") results compared to the number of times the test protocol is run. As such, the pass frequency may indicate that when the test is run on the same code version under conditions intended to be the same, the code successfully passes the test a certain portion of the times the test is run. For tests that may inherently include stochastic elements, or other characteristics that mean individual runs of the same test are not expected to yield the same results, these tests may nonetheless provide important pass/fail information for a function of the code. This information may be effectively evaluated by comparing the pass frequency across different code versions to determine whether the pass rate is relatively increasing, decreasing, or remaining the same.

As another reason, the pass frequency may be relevant because tests which frequently cause failures (on any tested code) may not be used for accepting code to the repository. That is, a test that frequently yields a fail (for any tested code) may be considered informational (e.g., passing the test is not essential for performance), or the test protocol or its test input data may be ineffective for testing the desired aspect of the code.

In one embodiment, the test result stability score may also be based on variation in subscores or other metrics associated with executing the test. As discussed in the example above, a "pass" or "fail" for a particular test may be determined based on a comparison of a value generated in the test to a threshold, such as whether an algorithm was executed within 30 seconds. The test result stability score may also be used to evaluate the relative variation of the relevant subscore results for a test. For example, a test run 4 times on a code version which results in results [pass, pass, fail, pass] and having associated execution times of [29, 29, 31, 30] may include a test result stability score describing the (relatively low) variation in execution times. More generally, the subscore results may be used to determine a statistical variation of the metrics across different runs of the protocol. The relatively low variation, despite the 75% pass frequency, may nonetheless suggest that the code is likely acceptable.

To determine a test result stability score, the process shown in FIG. 3 initially identifies 300 the code to be tested, for example to evaluate a new or revised test protocol with respect to a known code version (e.g., previously committed to the code repository or released in a version) or to determine test result stability score for a code version submitted for the code repository. An initial test quantity, e.g., the number of times to perform the test, is selected 310. The initial test quantity may be a set value, such as three or five times, or may be based on another factor, such as a baseline test result stability score for the particular test protocol. The baseline test result stability score may be based on a "known" version of the code or as an average of the test result stability scores as noted above. When the baseline test result stability score is relatively high (e.g., the results are relatively consistent and stable), the initial test quantity may be set relatively lower, as the results are expected to be similar; likewise, a lower baseline test result stability score may cause the initial test quantity to be set relatively higher, such that additional trials of the test can be run. Next, to run the tests, the code test environment, when required, may be established 320, e.g., such that the environment is initialized at the code test system 130 and relevant data for the code to be tested and the test protocol are initialized for execution. For example, the code may be combined with other code required for execution and may be compiled or otherwise assembled for processing in the test environment. The test may then be run 330 in the code test environment and the test result(s) determined 340.

The test may be run additional times until the initial test quantity of test runs is performed. In various embodiments, the initial quantity of tests may be performed in sequence or in parallel in different code test environments. Once the tests are completed, the test result stability score is determined 350 based on the test results (e.g., pass/fail) and, optionally, test metrics or subscores.

The test result stability score for a particular test run on a particular code version may have a given value with a certain confidence based on the number of times that the test protocol was run on the code version. For example, the code version may have a pass frequency of 66% [pass, fail, pass] when run three times. Due to the relatively limited number of times the test was run, there may be relatively limited confidence in the "true" test result stability score. As such, in one embodiment a range of possible test result stability scores may be determined with a given confidence value. Based on the test result stability score and, optionally, a determined range of the scores, the test may be run an additional number of times to revise the test result stability score (e.g. and narrow the range with a given confidence). In some embodiments, no additional tests are run when the test result stability score is relatively high (e.g., a 100% pass frequency). In this circumstance, the code version may pass the test and no additional tests are beneficial for determining whether to perform an action based on the results of the test on the code version.

To determine whether to run the additional tests, the test result stability score may also be compared with a threshold 360, such as a fixed value or the baseline test result stability score. As such, the additional tests may be selectively used to further refine and revise the test result stability score and in embodiments may do so only when the test result stability score is below a threshold and may provide additional information about the confidence of the test result stability score for accepting or rejecting the code version. As a working example, in an embodiment where the test result stability score reflects the pass frequency of the code, the initial test quantity may be five tests, resulting in a pass rate of 60% when the code is tested five times. The baseline test result stability score may be 70%, such that the test result stability score of the current code is below the baseline. Before rejecting the tested code, the test quantity may be increased to test the code an additional number of times to determine whether additional runs of the test reveal a higher pass frequency, such that the code may be accepted when its pass rate is similar to or exceeds the baseline rate.

The step of increasing the test quantity, refining the test result stability score, and comparing the test result stability score to determine whether to perform further tests may be repeated until sufficient confidence is determined for the code as applied to this test protocol. By performing additional tests based on the threshold and confidence of the test result stability score, resources for performing tests may be used conserved when tests successfully pass with high confidence and used when additional test runs may provide further actionable information. Finally, the test results and test result stability score may be returned for further use by a requesting system, such as the code test module 108 or the repository management module 106.

As such, the test result stability score may be used to determine if the test fails more frequently for the code being tested relative to other or prior versions of code, such as code from a branch earlier to the tested code.

As discussed above, the code may be tested at various times automatically, such as when a developer requests to commit code revisions to a code repository. In one embodiment, the test result stability score may be determined every time the test is run for a version of code; in other embodiments, the test protocol may be executed on the code version, and the test result stability score may be determined if the code version fails the test. As a further variation, a suite of tests may be performed on a code version, and only those tests which result in a failing result are further evaluated to determine a test result stability score of the code with respect to that test, permitting test resources to be conserved and applied only for those tests which appear to present a potential problem (e.g., which might erroneously block a code commit).

The test result stability score may be used for various purposes. First, as discussed above, the score may be used to accept or reject code for a code repository or otherwise automatically identify a problem committed code. In particular, the test result stability score may enable evaluation of a "fail" test result with additional nuance and enable code which had a "failing" test result to nonetheless be accepted when the pass frequency is relatively high. The subscore variation may also be used to determine whether to consider the test execution a pass despite a previous failing score. For example, a low level of variation with a modest pass frequency may indicate that the tested code version, even when it fails, is close to passing in those instances, such that the code may nonetheless accepted. The test result stability scores may also be used in the selection of tests for code evaluation, for example by selecting among tests that each evaluate a particular characteristic of the code based on the test result stability scores. Similarly, the test result stability scores may be used to select alternate tests for a particular characteristic. A first type of test may require relatively low resources to execute but have a relatively lower baseline test result stability score, where a second type of test requires relatively higher resources and also has a higher baseline test result stability score. As such, the first type of test may initially be used, and if a code version fails, then the second type of test may be used to more reliably determine whether the code version be considered a fail for the characteristic and "excuse" the failure on the low-resource low-test result stability score test.

Test Result Failure Verification

There may also be circumstances in which the operation of a test may change over time as discussed above. Such time-variant tests may include, for example, changes to processing components of the code test environment, changes to test data, errors operating or accessing external resources (or inconsistent/varying performance thereof) used for executing code with a test protocol. In these circumstances, it may appear that a current version of the code "fails" the test, where a prior version of the code successfully passed the test. In some circumstances, the "fail" may be due to variations in execution of the test based on the different timing of the test execution, rather than errors introduced in the code between the previous and the new code versions.

Figure 4:
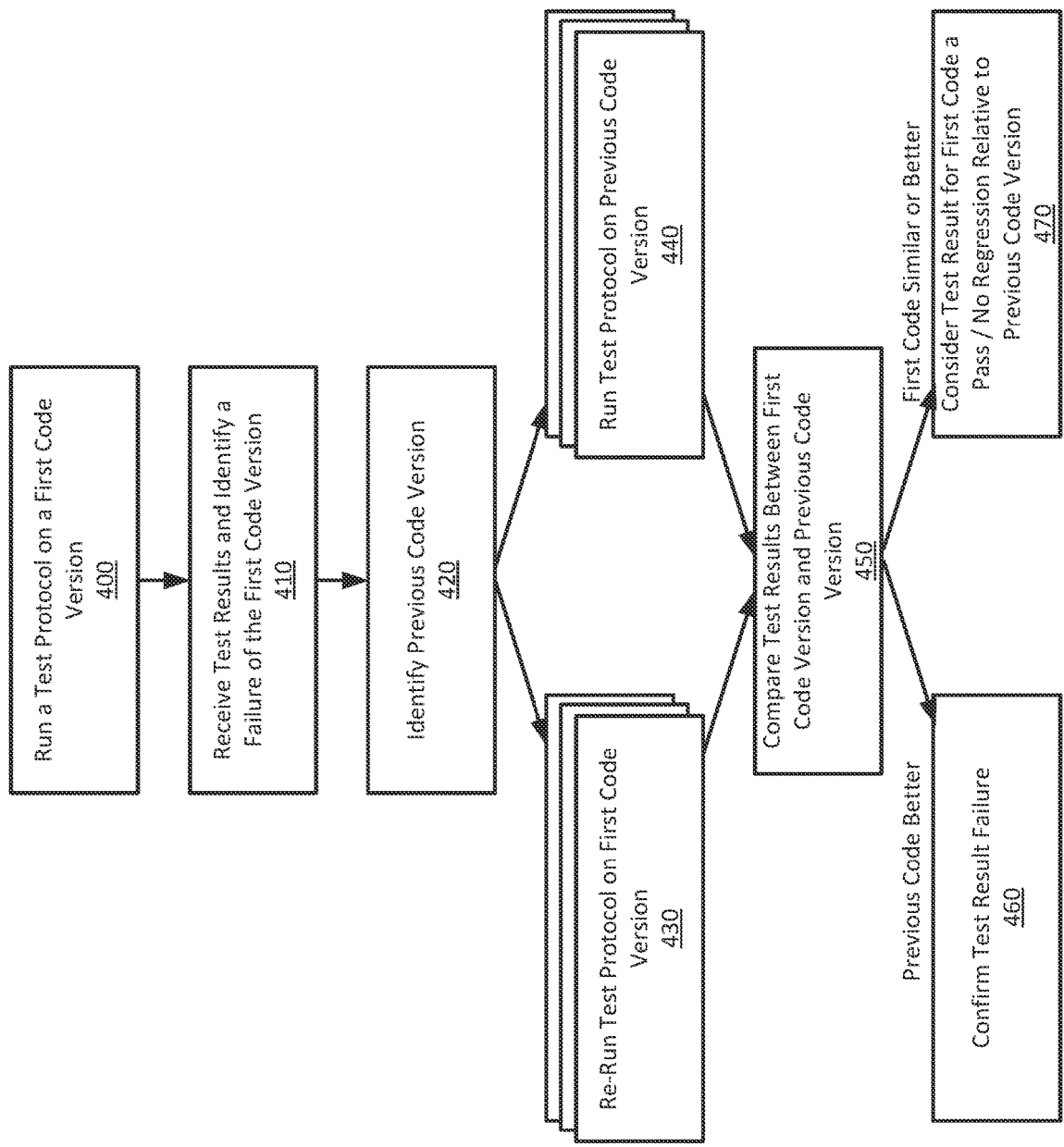
FIG. 4 provides a method for confirming or rejecting a test result failure, according to one embodiment.

FIG. 4 provides a method for confirming or rejecting a test result failure, according to one embodiment. To evaluate the test result failure and eliminate the possibility of a time-variant effect on executing the test, when a first code version fails a test protocol, a previous version of the code, typically a version which successfully passed the test, is retrieved and runs the test to determine whether the previous version, executed at the same/similar time as when the first version failed, produces similar results. Initially, the test protocol may be run 400 on a first code version, and test results may be received 410 that show a failure of the first code version with respect to the test protocol. To assess the possibility that the test failure was not due to time variation, a previous code version is identified 420. The identified code version may be a previously committed or released version of the code from which the first code version was developed. In addition, the previous code version may also be a code version which successfully passed the test protocol at a previous time to when the first code version failed it.

The test is then run 440 on the previous code version to determine test results of the previous code version as executing the test at the current time (e.g., close in time to when the first code version did not successfully meet the threshold for passing the test). In various embodiments, test may be re-run 430 on the first code version and/or run 440 on the previous code versions multiple times. When running the test multiple times, respective test result stability scores may also be generated for each code version, e.g., to describe the respective pass frequencies of the code versions.

The test results from the two code versions may be compared 450 to determine whether the previous code version, run at the same/similar time as the first code version which generated a failure, performs better than the first code version with respect to the test protocol. The test results may be characterized as the pass or failure of the results, various subscores of the results, pass frequency, or the test result stability score of the respective versions. When the first code performs similarly or better to the previous version, the first code version may then be considered 470 to have successfully passed the test despite the initial failure or that it introduces no regression relative to the previous code version. As such, in this circumstance, the "failure" may not be used with respect to further automatic actions performed in processing the test results. For example, this may permit usage of the first code version (e.g., to permit the code to be merged to the repository and not blocked based on the test failure) because the code does not introduce any new regressions relative to the prior code. In some embodiments, a message may also be sent to a developer to indicate the test failure and that the code was nonetheless accepted because its performance is not worse than the previous code version. When the previous code has better test results, the previous results for the first code (e.g., the failure) may confirmed 460, and any additional results from running (and optionally re-running) the test protocol on the first code version may be reported.

The identified previous code version selected for the comparison may typically be from a code version committed to the code repository, and may also be from a prior released version, in which case it can be determined that the first code version introduces no further regression relative to the previously released version. Similarly, when the previous code performs better, the first code version may in fact introduce a regression (e.g., the failing test result was likely not due to the time of execution of the test protocol). As such, this approach may be used to verify whether a failure is due to a test protocol that has components (known or unknown) that vary with time.

Example Embodiments

Various embodiments of claimable subject matter includes the following examples.

Example 1 provides for a method for evaluating a test protocol for software code, the method including: identifying software code and a test protocol for testing the software code; selecting an initial test quantity of times to run the test protocol on the software code; until the test protocol has been run on the software code a number of times corresponding to the initial test quantity, running the test protocol on the software code in a code test environment to determine test results of the test protocol for each run of the test protocol; determining a test result stability score based on a similarity of the test results for each run of the test protocol; and based on the test result stability score, running the test protocol an additional number of times to revise the test result stability score.

Example 2 provides for the method of example 1, wherein the test result stability score is a frequency of times that the test results indicate the software code passes the test protocol relative to the number of times the test protocol is run.

Example 3 provides for the method of example 1 or 2, wherein the test result stability score is based on a statistical variation of metrics in the test results for the respective runs of the test protocol.

Example 4 provides for the method of any of examples 1-3, wherein the test protocol is run no additional times when the test result stability score is above a threshold.

Example 5 provides for the method of any of examples 1-4, further comprising returning a successful test execution based on a comparison of the revised test result stability score to another test result stability score associated with execution of the test protocol on another version of the software code.

Example 6 provides for the method of examples 1-5, wherein the additional number of times is inversely related to the test result stability score, such that the additional number of times is higher when the test result stability score reflects relatively lower similarity of the test results.

Example 7 provides for the method of examples 1-6, wherein the test protocol is associated with a test category, and further comprising determining the revised test result stability score is below a pass threshold and executing an additional test protocol of the test category based on the determination.

Example 8 provides for the method of examples 1-7, wherein the initial test quantity is based on a baseline test result stability score associated with the test protocol executed on other software code.

Example 9 provides for a system comprising: a processor; and a non-transitory computer-readable storage medium containing instructions for execution by the processor for: identifying software code and a test protocol for testing the software code; selecting an initial test quantity of times to run the test protocol on the software code; until the test protocol has been run on the software code a number of times corresponding to the initial test quantity, running the test protocol on the software code in a code test environment to determine test results of the test protocol for each run of the test protocol; determining a test result stability score based on a similarity of the test results for each run of the test protocol; and based on the test result stability score, running the test protocol an additional number of times to revise the test result stability score.

Example 10 provides for the system of example 9, wherein the test result stability score is a frequency of times that the test results indicate the software code passes the test protocol relative to the number of times the test protocol is run.

Example 11 provides for the system of example 9 or 10, wherein the number of additional number of times is further based on a range of confidence values of the test result stability score.

Example 12 provides for the system of examples 9-11, wherein the test protocol is run no additional times when the test result stability score is above a threshold.

Example 13 provides for the system of examples 9-12, the instructions further executable for returning a successful test execution based on a comparison of the revised test result stability score to another test result stability score associated with execution of the test protocol on another version of the software code.

Example 14 provides for the system of examples 9-13, wherein the additional number of times is inversely related to the test result stability score, such that the additional number of times is higher when the test result stability score reflects relatively lower similarity of the test results.

Example 15 provides for the system of examples 9-14, wherein the test protocol is associated with a test category, and further comprising determining the revised test result stability score is below a pass threshold and executing an additional test protocol of the test category based on the determination.

Example 16 provides for the system of examples 9-15, wherein the initial test quantity is based on a baseline test result stability score associated with the test protocol executed on other software code.

Example 17 provides for one or more non-transitory computer-readable storage media containing instructions executable by one or more processors for: identifying software code and a test protocol for testing the software code; selecting an initial test quantity of times to run the test protocol on the software code; until the test protocol has been run on the software code a number of times corresponding to the initial test quantity, running the test protocol on the software code in a code test environment to determine test results of the test protocol for each run of the test protocol; determining a test result stability score based on a similarity of the test results for each run of the test protocol; and based on the test result stability score, running the test protocol an additional number of times to revise the test result stability score.

Example 18 provides for the one or more non-transitory computer-readable storage media of example 17, wherein the test result stability score is a frequency of times that the test results indicate the software code passes the test protocol relative to the number of times the test protocol is run.

Example 19 provides for the one or more non-transitory computer-readable storage media of examples 17 or 18, wherein the test result stability score is based on a statistical variation of metrics in the test results for the respective runs of the test protocol.

Example 20 provides for the one or more non-transitory computer-readable storage media of examples 17-19, wherein the test protocol is run no additional times when the test result stability score is above a threshold.

Other Implementation Notes, Variations, and Applications

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

Specifications, dimensions, and relationships outlined herein (e.g., the number of processors, logic operations, etc.) have been offered for purposes of example and teaching only. Such information may be varied considerably without departing from the spirit of the present disclosure, or the scope of the appended claims. In the foregoing description, various non-limiting example embodiments have been described with reference to particular arrangements of components. Various modifications and changes may be made to such embodiments without departing from the scope of the appended claims. This description and drawings are, accordingly, to be regarded in an illustrative rather than in a restrictive sense.

Note that with the numerous examples provided herein, interaction may be described in terms of two, three, four, or more components. However, this has been done for purposes of clarity and example only. It should be appreciated that the system can be consolidated in any suitable manner. Along similar design alternatives, any of the illustrated components, modules, and elements of the figures may be combined in various possible configurations, all of which are clearly within the broad scope of this disclosure.

Note that in this specification, references to various features (e.g., elements, structures, modules, components, steps, operations, characteristics, etc.) included in "one embodiment," "example embodiment," "an embodiment," "another embodiment," "some embodiments," "various embodiments," "other embodiments," "alternative embodiment," and the like are intended to mean that any such features are included in one or more embodiments of the present disclosure, but may or may not necessarily be combined in the same embodiments.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. Note that all optional features of the systems and methods described above may also be implemented with respect to the methods or systems described herein and specifics in the examples may be used anywhere in one or more embodiments.

What is claimed is:

1. A method for evaluating a test protocol for software code, the method comprising:
   identifying software code and a test protocol for testing the software code, wherein the test protocol is associated with a test category;
   selecting an initial test quantity of times to run the test protocol on the software code;
   until the test protocol has been run on the software code a number of times corresponding to the initial test quantity, running the test protocol on the software code in a code test environment to determine test results of the test protocol for each run of the test protocol;
   determining a test result stability score based on a statistical variation of metrics in the test results for the respective runs of the test protocol;
   based on the test result stability score, running the test protocol an additional number of times to revise the test result stability score; and
   determining the revised test result stability score is below a pass threshold and executing an additional test protocol of the test category based on the determination.

2. The method of claim 1, wherein the test result stability score includes a frequency of times that the test results indicate the software code passes the test protocol relative to the number of times the test protocol is run.

3. The method of claim 1, wherein the metrics include a number of execution times associated with respective runs of the test protocol.

4. The method of claim 1, wherein the test protocol is run no additional times when the test result stability score is above a threshold.

5. The method of claim 1, further comprising returning a successful test execution based on a comparison of the revised test result stability score to another test result stability score associated with execution of the test protocol on another version of the software code.

6. The method of claim 1, wherein the additional number of times is inversely related to the test result stability score, such that the additional number of times is higher when the test result stability score reflects relatively higher variation of the test results.

7. The method of claim 1, wherein the test result stability score has a confidence value based on the initial test quantity.

8. The method of claim 1, wherein the initial test quantity is based on a baseline test result stability score associated with the test protocol executed on other software code.

9. A system comprising:
   a processor; and
   a non-transitory computer-readable storage medium containing instructions for execution by the processor for:
      identifying software code and a test protocol for testing the software code, wherein the test protocol is associated with a test category;
      selecting an initial test quantity of times to run the test protocol on the software code;
      until the test protocol has been run on the software code a number of times corresponding to the initial test quantity, running the test protocol on the software code in a code test environment to determine test results of the test protocol for each run of the test protocol;
      determining a test result stability score based on a statistical variation of metrics in the test results for the respective runs of the test protocol;
      based on the test result stability score, running the test protocol an additional number of times to revise the test result stability score; and
      determining the revised test result stability score is below a pass threshold and executing an additional test protocol of the test category based on the determination.

10. The system of claim 9, wherein the test result stability score includes a frequency of times that the test results indicate the software code passes the test protocol relative to the number of times the test protocol is run.

11. The system of claim 9, wherein the number of additional number of times is further based on a range of confidence values of the test result stability score.

12. The system of claim 9, wherein the test protocol is run no additional times when the test result stability score is above a threshold.

13. The system of claim 9, the instructions further executable for returning a successful test execution based on a comparison of the revised test result stability score to another test result stability score associated with execution of the test protocol on another version of the software code.

14. The system of claim 9, wherein the additional number of times is inversely related to the test result stability score, such that the additional number of times is higher when the test result stability score reflects relatively higher variation of the test results.

15. The system of claim 9, wherein the test result stability score has a confidence value based on the initial test quantity.

16. The system of claim 9, wherein the initial quantity is based on a baseline test result stability score associated with the test protocol executed on other software code.

17. One or more non-transitory computer-readable storage media containing instructions executable by one or more processors for:
   identifying software code and a test protocol for testing the software code, wherein the test protocol is associated with a test category;
   selecting an initial test quantity of times to run the test protocol on the software code;
   until the test protocol has been run on the software code a number of times corresponding to the initial test quantity, running the test protocol on the software code in a code test environment to determine test results of the test protocol for each run of the test protocol;
   determining a test result stability score based on a statistical variation of metrics in the test results for the respective runs of the test protocol;
   based on the test result stability score, running the test protocol an additional number of times to revise the test result stability score; and
   determining the revised test result stability score is below a pass threshold and executing an additional test protocol of the test category based on the determination.

18. The one or more non-transitory computer-readable storage media of claim 17, wherein the test result stability score includes a frequency of times that the test results indicate the software code passes the test protocol relative to the number of times the test protocol is run.

19. The one or more non-transitory computer-readable storage media of claim 17, wherein the test result stability score has a confidence value based on the initial test quantity.

20. The one or more non-transitory computer-readable storage media of claim 17, wherein the test protocol is run no additional times when the test result stability score is above a threshold.

\* \* \* \* \*